(12) United States Patent
Mathur et al.

(10) Patent No.: US 9,369,739 B2
(45) Date of Patent: Jun. 14, 2016

(54) PRESERVING DYNAMIC RANGE PRECISION IN INTEGER IMAGE FORMATS

(71) Applicant: Avid Technology, Inc., Burlington, MA (US)

(72) Inventors: Shailendra Mathur, Beaconsfield (CA); Sylvain Girard, Montreal (CA)

(73) Assignee: Avid Technology, Inc., Burlington, MA (US)

(*) Notice: Subject to any disclaimer, the term of this patent is extended or adjusted under 35 U.S.C. 154(b) by 119 days.

(21) Appl. No.: 14/525,278

(22) Filed: Oct. 28, 2014

(65) Prior Publication Data

US 2016/0119652 A1 Apr. 28, 2016

(51) Int. Cl.
| | |
|---|---|
| *G06K 9/36* | (2006.01) |
| *G06K 9/46* | (2006.01) |
| *H04N 19/98* | (2014.01) |
| *H04N 19/80* | (2014.01) |
| *H04N 5/3745* | (2011.01) |
| *H04N 5/353* | (2011.01) |
| *G06T 5/00* | (2006.01) |
| *G06T 5/50* | (2006.01) |

(52) U.S. Cl.
CPC ............... *H04N 19/98* (2014.11); *G06T 5/007* (2013.01); *G06T 5/50* (2013.01); *H04N 5/3535* (2013.01); *H04N 5/3745* (2013.01); *H04N 19/80* (2014.11); *G06T 2200/21* (2013.01); *G06T 2207/10016* (2013.01); *G06T 2207/10024* (2013.01); *G06T 2207/10144* (2013.01); *G06T 2207/20012* (2013.01); *G06T 2207/20208* (2013.01)

(58) Field of Classification Search
CPC ..... H04N 19/98; H04N 19/80; H04N 5/3535; H04N 5/3745; G06T 5/007; G06T 2200/21; G06T 2207/10016; G06T 2207/10024; G06T 2207/10144; G06T 2207/20012; G06T 2207/20208; G06T 5/05
See application file for complete search history.

(56) References Cited

U.S. PATENT DOCUMENTS

2004/0190771 A1 9/2004 Eid et al.
2015/0358646 A1* 12/2015 Mertens ............... H04N 1/6058
362/166

(Continued)

OTHER PUBLICATIONS

Nezamabadi et al., "Color Signal Encoding for High Dynamic Range and Wide Color Gamut Based on Human Perception", Proc. SPIE9015.

(Continued)

*Primary Examiner* — Phuoc Tran
(74) *Attorney, Agent, or Firm* — Oliver Strimpel

(57) ABSTRACT

High dynamic range media sensor output is encoded using a hybrid transfer function. The hybrid transfer function conforms to existing industry standards over standard brightness level ranges, such as between black and white reference points, and uses a different function to encode captured signals having intensities below the black point and above the white point. Precision over the expanded dynamic range of captured image data is optimally preserved using a two-byte per pixel representation. The transfer function varies across the full dynamic range without clamping off below the maximum value of the expanded captured intensity range. One hybrid transfer function conforms to BT.1886 up to the white point, and uses a linearly varying encoding gamma above the white point up to 1300% IRE, producing encoded values in a 2.14 fixed point representation. The hybrid transfer function is continuous at the white point, and may also have a continuous gradient there.

23 Claims, 2 Drawing Sheets

(56) References Cited

U.S. PATENT DOCUMENTS

2016/0005349 A1\* 1/2016 Atkins .................... H04N 5/20
   345/591
2016/0012570 A1\* 1/2016 Zhang ................... G06T 3/4015
   382/167

OTHER PUBLICATIONS

Color Imaging XIX: Displaying, Processing, Hardcopy, and Applications, 90150C, Jan. 8, 2014, 2 pages.

\* cited by examiner

PRESERVING DYNAMIC RANGE PRECISION IN INTEGER IMAGE FORMATS

BACKGROUND

Cameras are capturing an increased dynamic range of image data, both through increased sensitivity of the sensors themselves, as well as via the use of multiple exposures. Automatic combination of several images taken over different intensity ranges is often performed as a high dynamic range (HDR) setting, even on consumer cameras. This enables a camera to capture high color resolution between the various color levels whether the levels correspond to shadows, mid-tones, or highlights. Such high dynamic range images contain more data than images having the traditional dynamic range. However, unless appropriate methods are used to encode and store the added information, some or all of the expanded image data is lost. The risk of data loss may become exacerbated when applying video effects that change the dynamic range temporarily while performing image processing tasks. There is a need for encoding and storage schemes that preserve the newly available detail throughout media editing workflows, while at the same time attempting to limit the associated increase in image storage requirements.

SUMMARY

In general, the methods, systems, and computer program products described herein enable high dynamic range images to be stored in a format that is efficient from both storage and computational standpoints, while retaining image data precision across the full range of captured image values.

In general, in one aspect, a method of encoding digital image data comprises: receiving signals from an image sensor, wherein a maximum range of possible values of the received signals corresponds to a maximum range of intensity levels capable of being detected by the image sensor, the maximum range of intensity levels capable of being detected by the image sensor including intensity levels above a reference white point level; and encoding the received image signals into a selected image representation using a hybrid transfer function, wherein: the hybrid transfer function is defined across the maximum range of possible values of the received signals and maps the maximum range of possible values of the received signals to a full range of values that can be represented by the selected image representation; and for values of the received signals corresponding to a range of intensity levels between a lower intensity level and an upper intensity level over which an industry standard transfer function is defined, the hybrid transfer function conforms to the industry standard transfer function.

Various embodiments include one or more of the following features. The upper intensity level corresponds to the reference white point; the lower intensity level corresponds to a reference black point. The hybrid transfer function is of the form $$V = AL^\gamma - B,$$

wherein V represents the encoded value, A and B are constants, L represents signals from the image sensor, and $\gamma$ represents an encoding gamma that varies over the range of intensity levels above the reference white point. The selected image representation is a two-byte integer representation or a 2.14 fixed point integer representation. The maximum intensity capable of being detected by the image sensor is in the range of 13 to 15 times the intensity at the white point. The slope of the hybrid transfer function is continuous at the upper intensity level. The encoding gamma is varied linearly over a range of intensities above the upper intensity level. The encoding gamma is varied logarithmically over a range of intensities above the upper intensity level. The industry standard transfer function is defined by an ITU-R BT.1886 specification, an ITU-R BT.709 specification, ITU-R BT.2020 specification, or a SMPTE RP-431-2 specification. The maximum intensity range of the received signals is encoded by the hybrid transfer function into values ranging from 0 to 2. The encoded image signals are represented by an unsigned two-byte integer representation such that over the maximum intensity range of the received signals the hybrid transfer function outputs encoded values ranging from 0 to 4.

In general, in another aspect, a computer program product comprises: a non-transitory computer-readable medium with computer program instructions encoded thereon, wherein the computer program instructions, when processed by a computer, instruct the computer to perform a method of encoding digital image data, the method comprising: receiving signals from an image sensor, wherein a maximum range of possible values of the received signals corresponds to a maximum range of intensity levels capable of being detected by the image sensor, the maximum range of intensity levels capable of being detected by the image sensor including intensity levels above a reference white point level; and encoding the received image signals into a selected image representation using a hybrid transfer function, wherein: the hybrid transfer function is defined across the maximum range of possible values of the received signals and maps the maximum range of possible values of the received signals to a full range of values that can be represented by the selected image representation; and for values of the received signals corresponding to a range of intensity levels between a lower intensity level and an upper intensity level over which an industry standard transfer function is defined, the hybrid transfer function conforms to the industry standard transfer function.

In general, in a further aspect, a system comprises: a memory for storing computer-readable instructions; and a processor connected to the memory, wherein the processor, when executing the computer-readable instructions, causes the system to perform a method of encoding digital image data, the method comprising: receiving signals from an image sensor, wherein a maximum range of possible values of the received signals corresponds to a maximum range of intensity levels capable of being detected by the image sensor, the maximum range of intensity levels capable of being detected by the image sensor including intensity levels above a reference white point level; and encoding the received image signals into a selected image representation using a hybrid transfer function, wherein: the hybrid transfer function is defined across the maximum range of possible values of the received signals and maps the maximum range of possible values of the received signals to a full range of values that can be represented by the selected image representation; and for values of the received signals corresponding to a range of intensity levels between a lower intensity level and an upper intensity level over which an industry standard transfer function is defined, the hybrid transfer function conforms to the industry standard transfer function.

In general, in yet another aspect, a method of encoding high dynamic range digital image data comprises: receiving the high dynamic range digital image data, wherein a maximum possible range of pixel values of the received high dynamic range digital image data includes pixel values below a reference black point value and above a reference white point value; and encoding the received high dynamic range digital image data into a selected image representation using a hybrid transfer function, wherein: the hybrid transfer function is defined across the maximum possible range of pixel values of the received high dynamic range digital image data and maps the maximum range of possible values of the received high dynamic range digital image data to a full range of values that can be represented by the selected image representation; and for values of the received high dynamic range digital image data corresponding to a range of pixel values between a lower value and an upper value over which an industry standard transfer function is defined, the hybrid transfer function conforms to the industry standard transfer function.

Various embodiments include one or more of the following features. The high dynamic range image data was captured by a video camera. The high dynamic range image data comprises a computer-generated scene rendering and/or a computer-generated effect.

In general, in still another aspect, a method of decoding high dynamic range digital image data comprises: receiving encoded high dynamic range digital image data including image pixel values that were encoded into a digital image representation using a hybrid transfer function, wherein portions of a full range of possible encoded values in the digital image representation are used to represent image pixel values above a reference white point and below a reference black point; decoding the received high dynamic range digital image data into image pixel values using an inverse of the hybrid transfer function, wherein the inverse of the hybrid transfer function maps the full range of possible encoded values in the digital image representation into a maximum range of possible pixel values of the high dynamic range image data; and for encoded values of the high dynamic range image data corresponding to a range of pixel values between a lower and an upper value over which an industry standard transfer function is defined, the inverse hybrid transfer function conforms to an inverse of the industry standard transfer function.

DETAILED DESCRIPTION

Figure 1:
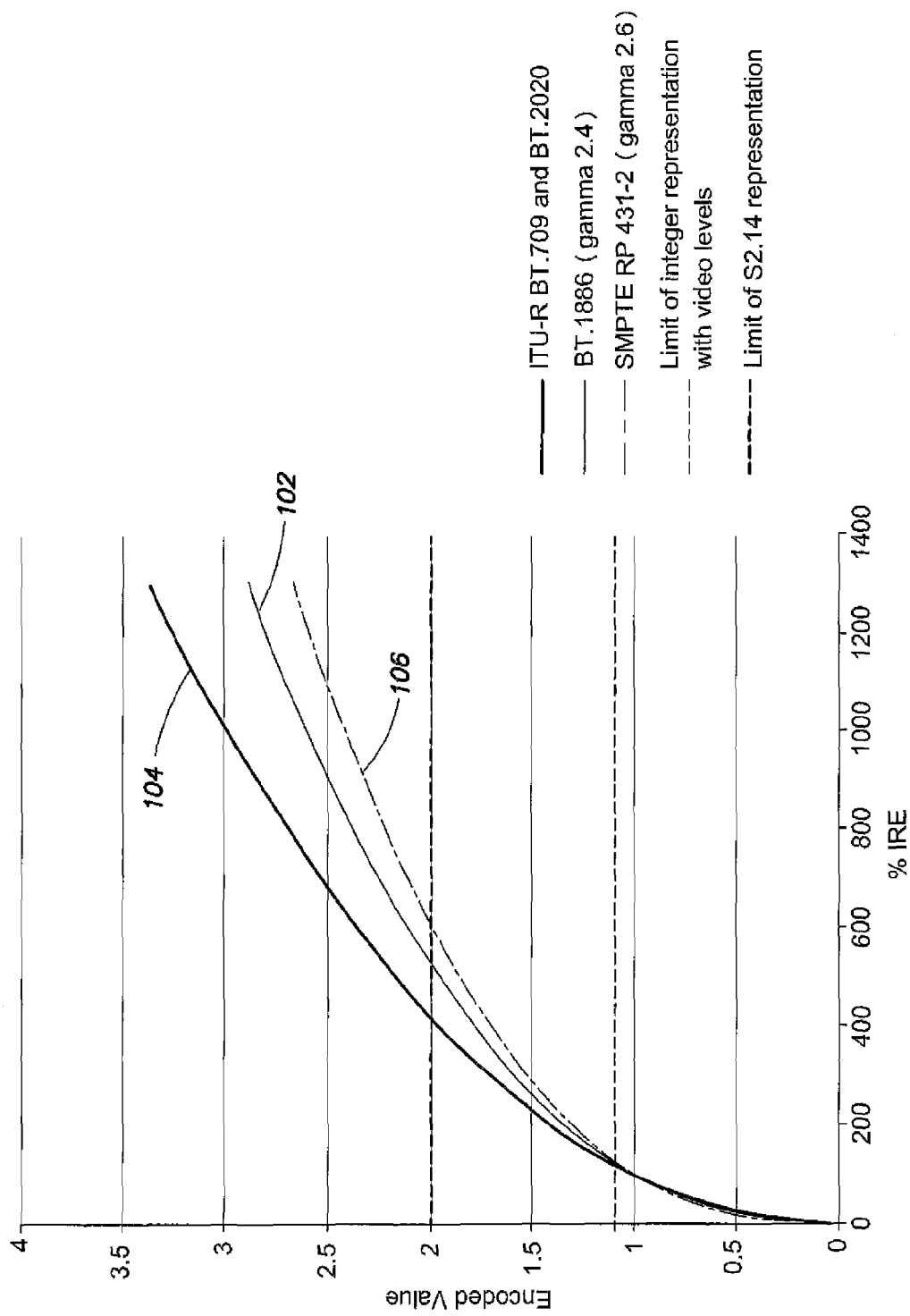
FIG. 1 is a plot of existing EOTFs extrapolated above the white point.

Cameras are now able to capture multiple exposures of a given frame, which expands to far higher brightness levels the precision that has hitherto been available only between predefined black and white points. In addition, the sensors deployed in cameras have increasing dynamic range. In image terms, this provides an opportunity to capture the same color level resolution for a much greater proportion of points in an image, including those that fall within image areas representing shadows, mid-tones, or highlights.

When the output of a camera CCD is acquired, a relative intensity scale, such as the IRE (Institute of Radio Engineers) scale, may be used to quantify the brightness levels. On that scale, the intensity that is considered white (called "reference white") corresponds 100%. Cameras are no longer limited to the capture data between reference black and white points, or 0 to 100% IRE. They can now discriminate brightness levels much higher than reference white, reaching up to 1300% or even 1500% IRE in some cases.

In most applications, the raw camera data is not used directly. The data is first transformed by a non-linear transfer function selected for a particular application, such as for displaying on a monitor, a projector, storing to persistent media, or additional image processing. Such transfer functions are referred to as "electro-optical transfer functions" (EOTF). Specific EOTFs used to encode the video data for display on a flat-panel, CRT display or projectors have been standardized. Examples of standardized EOTFs include ITU-R BT.709 and ITU-R BT.1886, the industry standard commonly adopted for HDTV flat panel displays. Together with the transfer function, the mapping to reference black and white is also stored since certain effects and displays need this mapping information in order to be processed. As an example, the reference black value is important when applying a contrast effect that performs a scaling and rotation of the color values around the reference black pivot point. Similarly a white point may be used to determine the video levels required to make a clip compatible with older broadcast systems that are not capable of handling values above 100% IRE.

In addition to transforming camera image data in real time, EOTFs may also be used to transform material that has previously been recorded in a camera-specific raw file format. The raw image data may also originate from a non-camera source, such as a high-precision rendering of a computer-generated scene or of a video effect. Indeed, any source that generates image data in a format that has a wide dynamic range may be converted into a format suitable for editing and storage by using an EOTF.

The following table provides a few examples of EOTF transfer functions. In the table, L corresponds to a light intensity value with reference black and white corresponding to L=0.0 and L=1.0, respectively. V represents the encoded non-linear value.

| | Transfer function |
|---|---|
| ITU-R BT. 709 and BT. 2020 | $V = 4.500L$, $L < 0.018$ <br> $V = 1.099L^{0.45} - 0.099$, $L \geq 0.018$ |
| ITU-R BT. 1886 | $V = L^{1/2.4}$, $L \leq 1.0$ |
| SMPTE RP431-2 | $V = L^{1/2.6}$, $L \leq 1.0$ |

The increase in resolution, bit depth, and frame rate of cameras outstrips the pace at which the media creation industry has adopted new video standards that make full use of the expanded scope of captured image data. However, the owners of the advanced, high dynamic range imagery wish to preserve as much as possible of the information in the original content, especially when image processing is applied to generate intermediate results in a chain of effects such as those applied during editing or compositing. They further wish to do this in a way that is cost-effective in terms of memory, storage, and computation. Furthermore, since the advanced media continues to be used to generate deliverables in existing lower bandwidth formats, the data needs to be maintained in a form that retains compatibility with existing standards.

Table 1 shows the characteristics full range integer formats, "video levels" integer formats, and "fixed-point" formats discussed herein.

TABLE 1

|  | min | min code value | reference black | code value | reference white | white code value | max | max code value |
|---|---|---|---|---|---|---|---|---|
| Full range integer formats | | | | | | | | |
| 8-bit integer | 0.0 | 0 | 0.0 | 0 | 1.0 | 255 | 1.0 | 255 |
| 10-bit integer | 0.0 | 0 | 0.0 | 0 | 1.0 | 1023 | 1.0 | 1023 |
| 12-bit integer | 0.0 | 0 | 0.0 | 0 | 1.0 | 4095 | 1.0 | 4095 |
| 16-bit integer | 0.0 | 0 | 0.0 | 0 | 1.0 | 65535 | 1.0 | 65535 |
| "Video levels" integer formats | | | | | | | | |
| 8-bit integer | −0.07306 | 0 | 0.0 | 16 | 1.0 | 235 | 1.1643836 | 255 |
| 10-bit integer | −0.07306 | 0 | 0.0 | 64 | 1.0 | 940 | 1.1678082 | 1023 |
| 12-bit integer | −0.07306 | 0 | 0.0 | 256 | 1.0 | 3760 | 1.1686644 | 1023 |
| "Fixed-point" formats (2.14) | | | | | | | | |
| Unsigned 2.14 | 0.0 | 0 (0x0000) | 0.0 | 0 (0x0000) | 1.0 | 16384 (0x4000) | 3.999939 | 65535 (0xFFFF) |
| Signed 2.14 | −2.0 | −32768 (0x8000) | 0.0 | 0 (0x0000) | 1.0 | 16384 (0x4000) | 1.999939 | 32767 (0x7FFF) |

Full range integer encoding quantizes the input values into the maximum number of levels allowed by the bit depth of the representation, storing the values between 0% IRE and 100% IRE and clipping the values below and above those limits. The 8 and 16 bit formats are especially popular as media storage formats, both for their space efficiency, as well as for their easy mapping to in-memory representations on systems which store sample values as multiple bytes. An important limitation of these formats is their inability to accommodate any excursion of values below or above given reference black and white points. This renders them unsuitable for storing high dynamic range imagery.

"Video-levels" integer formats are similar to full range formats, except that the input is mapped to a standard-defined range of code values often referred to as "video levels." In such standard representations, the 0% to 100% IRE range between reference black and reference white points consumes most of the available bits. In a 10 bit integer format, for example, the range between black and white reference points corresponds to levels between 64 and 940 out of the 1024 levels available. This only leaves code values from 940 to 1023 to represent the remainder of the dynamic range, i.e., from 100% to 1300% IR (or up to 1500% IRE, or some other upper limit of the captured range). Thus such integer representations allocate a relatively small number of discrete levels for a wide input range, resulting in quantization errors in bright image areas, such as those that represent highlights. Such quantization errors become especially apparent when "above white" data is used in image processing operations such as color correction.

"Fixed-point" formats generally correspond to a simple scaling of a range of interest. These may be used to encode the image data in a manner that retains the increased quantity of information associated with advanced media formats. These formats preserve the correspondence of the storage format with the in-memory buffer format by aligning values along a two-byte boundary both in memory and in disk storage, while providing high precision and a larger range of encoded values to store image data values below 0% IRE and above 100% IRE than integer formats presented previously. Thus fixed-point formats represent an effective compromise in which the limitations of integer and video level formats are overcome without requiring a significant increase in memory requirements.

For a 2.14 fixed-point representation, each code value is worth $1/16384$ of the input range. (The name "2.14" originates from the binary representation of the encoded value. The 2 most significant bits map to the integer part of the value, whereas the 14 remaining bits correspond to the fractional part.) The signed 2.14 format can hold values from −2.0 inclusively to +2.0 exclusively. When using this format, 0 and 100% IRE values can be mapped to 0.0 and 1.0, respectively, leaving the range from 1.0 to 2.0 free to hold data representing high-intensity information.

In various embodiments, the negative range of encoded values, i.e., from −2.0 to 0.0, is not used to map the input signals, but is left free to store intermediate results of various image processing operations that may be performed on the imagery. However, during acquisition (rather than processing), the unsigned 2.14 representation may be used. Its range, from 0.0 to 4.0, provides an even greater code value range to map the portion of the range above 100% IRE, e.g., up to 1300% IRE.

If existing industry standard EOTFs are simply scaled to span a two-byte range (e.g., 2.14 fixed point representation), they do not result in an optimal encoding of the high dynamic range image data, as is illustrated in FIG. 1. For example, if a BT.1886 (gamma 2.4) EOTF is extrapolated, the resulting EOTF (102) clamps off at about 520% IRE. Similarly, an extrapolation of the ITU-R BT.709 and BT.2020 (104) clamps off at about 420% IRE, and SMPTE RP 431-2 (gamma 2.6) (106) clamps off at about 650% IRE.

In the described embodiments, a 2.14 fixed point representation is used in which the EOTF is tailored to distribute the entire high dynamic range linear signal range, e.g., from 0 to 1300% IRE, smoothly across the available two-byte encoded values, while maintaining complete compatibility with an existing standard EOTF over the range for which they have been defined. As one example, new EOTFs are designed to match the BT.1886 EOTF over the range 0-100% IRE. The methods described herein may also be tailored to be compatible with other industry standard curves, such those illustrated in FIG. 1, over the range for which they were originally defined, and to extend continuously to span the encoded dynamic range offered by a two-byte pixel encoding.

In a first embodiment, the EOTF above 100% IRE is generated by a power function with a different value of the exponent above 100% IRE from that used by a standard EOTF over the range 0 to 100% IRE. The governing equation is of the form:

$$V(L) = L^{1/\gamma_1}, \quad 0 \leq L \leq 1$$

$$V(L) = L^{1/\gamma_2}, \quad 1 < L \leq 13.0$$

For compatibility with BT.1886, the encoding gammas are $\gamma_1 = 2.4$ and $\gamma_2 = 3.7$, where the value of $\gamma_2$ is derived from the boundary condition constraints. The corresponding EOTF curve which is compatible with BT.1886 (i.e., conforms to BT.1886 over the range from zero to the white point) is plotted in FIG. 2 (202).

While this curve reasonably distributes the linear signal range across the available range of encoded values, there is a discontinuity in the EOTF gradient at the white point. The discontinuity may produce detectable artifacts in the imagery, especially when image processing focuses on a narrow range of image brightness values spanning the white point.

Figure 2:
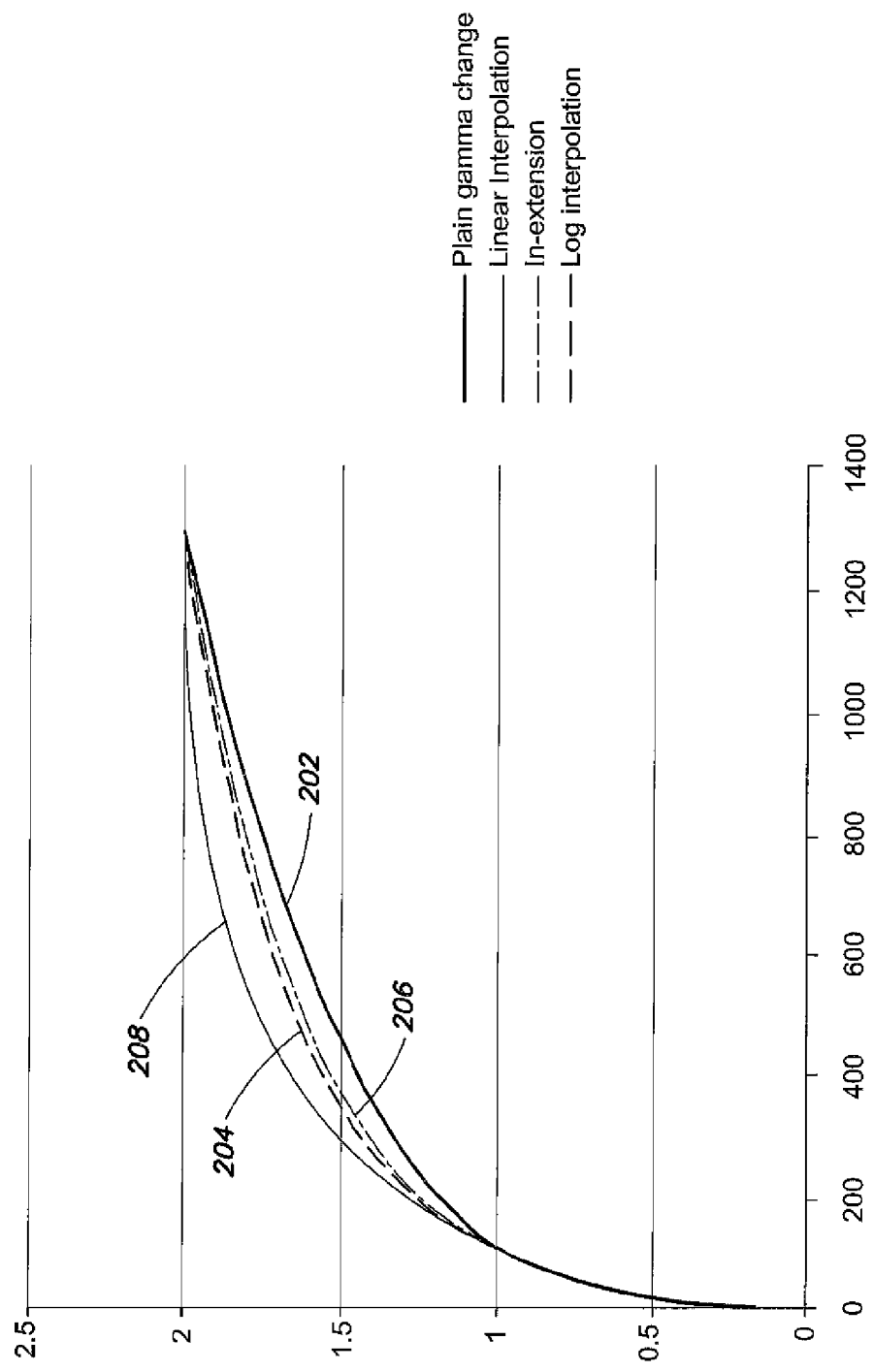
FIG. 2 is a plot of electro-optical transfer functions compatible with a standard EOTF adapted to represent brightness values above the white point.

Other transfer functions in which the knee in the EOTF at the white point is minimized (or eliminated) are shown in FIG. 2. This time, in addition to the boundary conditions applied above, the additional condition of matching the slope of an existing standard EOTF as closely as possible at the white point is imposed. Again, in this example, the existing standard EOTF used is BT.1886.

Matching the slope may be achieved by interpolating the gamma coefficient in the transfer function over the intended range. There are multiple ways to interpolate the coefficient. Two illustrative examples are described here.

A logarithmically varying encoding gamma transfer function that extends the BT.1886 EOTF is illustrated in FIG. 2 (204). Above the white point, the EOTF has the general form:

$$V = L^{\frac{1}{\gamma_1 + \gamma_d \frac{\log L}{\log 12}}}$$

in which $\gamma_1$ is obtained by evaluating the slope of the EOTF at the white reference point, and $\gamma_d$ is the difference between $\gamma_1$ and $\gamma_2$.

A linearly varying encoding gamma transfer function is also possible. The general form of this variation is:

$$\gamma = \gamma_1 + \gamma_d \frac{L-1}{12}$$

and the corresponding curve is shown in FIG. 2 (208).

One possible inconvenience of these functions is that they cannot be inverted symbolically. One has to use a numerical approach to obtain the inverse transfer function. It is not a big problem in practice, however, because these functions are typically implemented using pre-computed look-up tables. It is quite possible to obtain the reverse look-up table using only the forward equation.

Matching the slope as well as the general aspect of the curve can also be achieved using a different function. As a variation of the method, BT.1886 is extended by using the equation V=1+ln(L)/ln(13) above the white point, as illustrated by the curve labeled 206 in FIG. 2.

While this provides a curve that can be inverted symbolically, the slopes before and after the white reference point do not match perfectly. However, the discontinuity is believed to be small enough for all practical purposes.

Table 1 summarizes the embodiments described above.

TABLE 1

| | Transfer functions |
|---|---|
| ITU-R BT. 1886 | $V(L) = L^{1/2.4}, 0 < L \leq 1.0$ |
| Interpolating γ using a log function | $V(L) = L^{\frac{1}{2.4+1.3\frac{\log L}{\log 13}}}, L > 1.0$ |

TABLE 1-continued

| | Transfer functions |
|---|---|
| Extending the curve with a log function directly | $V(L) = 1 + \frac{\ln L}{\ln 13}, L > 1.0$ |
| Extending the curve with a linear interpolation of the exponent | $V(L) = L^{\frac{1}{2.4+1.3\frac{L-1}{12}}}, L > 1.0$ |

As used herein, the term "industry standard transfer function" refers to transfer functions that have been standardized by an industry body, such as the Society for Motion Picture and Television Engineers (SMPTE), the International Telecommunication Union (ITU) or the European Broadcasting Union (EBU). It also includes de-facto standards, including transfer functions used by leading participants in the camera and video industry, such as Sony, Panasonic, Canon, RED and ARRI, as well as functions used to encode data logarithmically in popular file formats such as "DPX," that may not be specified by a standards body.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of encoding digital image data, the method comprising:
   receiving signals from an image sensor, wherein a maximum range of possible values of the received signals corresponds to a maximum range of intensity levels capable of being detected by the image sensor, the maximum range of intensity levels capable of being detected by the image sensor including intensity levels above a reference white point level; and
   encoding the received image signals into a selected image representation using a hybrid transfer function, wherein:
      the hybrid transfer function is defined across the maximum range of possible values of the received signals and maps the maximum range of possible values of the received signals to a full range of values that can be represented by the selected image representation; and
      for values of the received signals corresponding to a range of intensity levels between a lower intensity level and an upper intensity level over which an industry standard transfer function is defined, the hybrid transfer function conforms to the industry standard transfer function.

2. The method of claim 1, wherein the upper intensity level corresponds to the reference white point.

3. The method of claim 1, wherein the lower intensity level corresponds to a reference black point.

4. The method of claim 1, wherein the hybrid transfer function is of the form $$V = AL^\gamma - B,$$

wherein V represents the encoded value, A and B are constants, L represents signals from the image sensor, and $\gamma$ represents an encoding gamma that varies over the range of intensity levels above the reference white point.

5. The method of claim 1, wherein the selected image representation is a two-byte integer representation.

6. The method of claim 5, wherein the selected image representation is a 2.14 fixed point integer representation.

7. The method of claim 1, wherein a maximum intensity capable of being detected by the image sensor is in the range of 13 to 15 times the intensity at the white point.

8. The method of claim 1, wherein a slope of the hybrid transfer function is continuous at the upper intensity level.

9. The method of claim 1, wherein the encoding gamma is varied linearly over a range of intensities above the upper intensity level.

10. The method of claim 1, wherein the encoding gamma is varied logarithmically over a range of intensities above the upper intensity level.

11. The method of claim 1, wherein the industry standard transfer function is defined by an ITU-R BT.1886 specification.

12. The method of claim 1, wherein the industry standard transfer is defined by an ITU-R BT.709 specification.

13. The method of claim 1, wherein the industry standard transfer function is defined by an ITU-R BT.2020 specification.

14. The method of claim 1, wherein the industry standard transfer function is defined by an SMPTE RP-431-2 specification.

15. The method of claim 1, wherein the maximum intensity range of the received signals is encoded by the hybrid transfer function into values ranging from 0 to 2.

16. The method of claim 1, wherein the encoded image signals are represented by an unsigned two-byte integer representation such that over the maximum intensity range of the received signals the hybrid transfer function outputs encoded values ranging from 0 to 4.

17. A computer program product comprising:
   a non-transitory computer-readable medium with computer program instructions encoded thereon, wherein the computer program instructions, when processed by a computer, instruct the computer to perform a method of encoding digital image data, the method comprising:
   receiving signals from an image sensor, wherein a maximum range of possible values of the received signals corresponds to a maximum range of intensity levels capable of being detected by the image sensor, the maximum range of intensity levels capable of being detected by the image sensor including intensity levels above a reference white point level; and
   encoding the received image signals into a selected image representation using a hybrid transfer function, wherein:
      the hybrid transfer function is defined across the maximum range of possible values of the received signals and maps the maximum range of possible values of the received signals to a full range of values that can be represented by the selected image representation; and
      for values of the received signals corresponding to a range of intensity levels between a lower intensity level and an upper intensity level over which an industry standard transfer function is defined, the hybrid transfer function conforms to the industry standard transfer function.

18. A system comprising:
   a memory for storing computer-readable instructions; and
   a processor connected to the memory, wherein the processor, when executing the computer-readable instructions, causes the system to perform a method of encoding digital image data, the method comprising:
      receiving signals from an image sensor, wherein a maximum range of possible values of the received signals corresponds to a maximum range of intensity levels capable of being detected by the image sensor, the maximum range of intensity levels capable of being detected by the image sensor including intensity levels above a reference white point level; and
      encoding the received image signals into a selected image representation using a hybrid transfer function, wherein:
         the hybrid transfer function is defined across the maximum range of possible values of the received signals and maps the maximum range of possible values of the received signals to a full range of values that can be represented by the selected image representation; and
         for values of the received signals corresponding to a range of intensity levels between a lower intensity level and an upper intensity level over which an industry standard transfer function is defined, the hybrid transfer function conforms to the industry standard transfer function.

19. A method of encoding high dynamic range digital image data, the method comprising:
   receiving the high dynamic range digital image data, wherein a maximum possible range of pixel values of the received high dynamic range digital image data includes pixel values below a reference black point value and above a reference white point value; and
   encoding the received high dynamic range digital image data into a selected image representation using a hybrid transfer function, wherein:
      the hybrid transfer function is defined across the maximum possible range of pixel values of the received high dynamic range digital image data and maps the maximum range of possible values of the received high dynamic range digital image data to a full range of values that can be represented by the selected image representation; and
      for values of the received high dynamic range digital image data corresponding to a range of pixel values between a lower value and an upper value over which an industry standard transfer function is defined, the hybrid transfer function conforms to the industry standard transfer function.

20. The method of claim 19, wherein the high dynamic range image data was captured by a video camera.

21. The method of claim 19, wherein the high dynamic range image data comprises a computer-generated scene rendering.

22. The method of claim 19, wherein the high dynamic range image data comprises a computer-generated effect.

23. A method of decoding high dynamic range digital image data, the method comprising:
   receiving encoded high dynamic range digital image data including image pixel values that were encoded into a digital image representation using a hybrid transfer function, wherein portions of a full range of possible encoded values in the digital image representation are used to represent image pixel values above a reference white point and below a reference black point;
   decoding the received high dynamic range digital image data into image pixel values using an inverse of the hybrid transfer function, wherein
      the inverse of the hybrid transfer function maps the full range of possible encoded values in the digital image representation into a maximum range of possible pixel values of the high dynamic range image data; and
      for encoded values of the high dynamic range image data corresponding to a range of pixel values between a lower and an upper value over which an industry standard transfer function is defined, the inverse hybrid transfer function conforms to an inverse of the industry standard transfer function.

\* \* \* \* \*